United States Patent
Knyrim et al.

(10) Patent No.: US 12,377,917 B2
(45) Date of Patent: Aug. 5, 2025

(54) FRONT STRUCTURE FOR A UTILITY VEHICLE, PREFERABLY FOR A LORRY

(71) Applicant: MAN Truck & Bus SE, Munich (DE)

(72) Inventors: Thomas Knyrim, Munich (DE); Alexander Stockmaier, Munich (DE); Alexander Kopp, Munich (DE)

(73) Assignee: MAN Truck & Bus SE, Munich (DE)

( * ) Notice: Subject to any disclaimer, the term of this patent is extended or adjusted under 35 U.S.C. 154(b) by 318 days.

(21) Appl. No.: 18/008,138

(22) PCT Filed: May 26, 2021

(86) PCT No.: PCT/EP2021/064006
§ 371 (c)(1),
(2) Date: Dec. 2, 2022

(87) PCT Pub. No.: WO2021/244911
PCT Pub. Date: Dec. 9, 2021

(65) Prior Publication Data
US 2023/0286587 A1 Sep. 14, 2023

(30) Foreign Application Priority Data
Jun. 3, 2020 (DE) ...................... 10 2020 114 756.2

(51) Int. Cl.
*B62D 21/15* (2006.01)
*B60K 11/04* (2006.01)
*B60R 19/56* (2006.01)

(52) U.S. Cl.
CPC ............ *B62D 21/152* (2013.01); *B60K 11/04* (2013.01); *B60R 19/56* (2013.01)

(58) Field of Classification Search
CPC ....... B62D 21/152; B60K 11/04; B60R 19/56; B60Y 2200/1422; B60Y 2306/01
See application file for complete search history.

(56) References Cited

U.S. PATENT DOCUMENTS

2010/0314426 A1  12/2010  Yokoi et al.
2015/0251613 A1*  9/2015  Mori .................... B62D 21/152
                                                         293/133

FOREIGN PATENT DOCUMENTS

DE        3246583 C1    4/1984
DE      19850590 A1    5/2000
(Continued)

OTHER PUBLICATIONS

EP 2719565 A1 with English translation (Year: 2014).*
(Continued)

*Primary Examiner* — Lori Lyjak
(74) *Attorney, Agent, or Firm* — Weber Rosselli & Cannon LLP

(57) ABSTRACT

The invention relates to a front structure for a utility vehicle, preferably for a lorry, as well as a utility vehicle comprising a front structure of this type. The front structure comprises two lateral longitudinal frame rails, a cooling module arranged between the longitudinal frame rails and supported on the longitudinal frame rail via lateral pivot bearings with a common pitch axis, and a pendulum support secured to the cooling module and supported directly or indirectly on the longitudinal frame rail for absorbing tilting movements of the cooling module. The pendulum support is characterised by a target failure point, which is designed to fail in the event of a head-on crash with a crash-related application of force, in order to release a tilting movement of the cooling module and/or to no longer absorb same. In this way, in the event of a head-on crash, the backward displacement of a driver cabin mounted on the front structure can be improved and the intrusion of the driver cabin can thereby be reduced and the safety of the occupant improved.

19 Claims, 4 Drawing Sheets

(56) References Cited

FOREIGN PATENT DOCUMENTS

| | | |
|---|---|---|
| DE | 10150643 A1 | 4/2003 |
| DE | 10207025 A1 | 8/2003 |
| DE | 102006034722 A1 | 1/2008 |
| DE | 102007020914 A1 | 11/2008 |
| DE | 102008019187 A1 | 10/2009 |
| EP | 0972700 A2 | 1/2000 |
| EP | 1106413 A2 | 6/2001 |
| EP | 1635050 A2 | 3/2006 |
| EP | 2397391 A2 | 12/2011 |
| EP | 2719565 A1 | 4/2014 |
| FR | 2478551 A1 * | 9/1981 |
| FR | 2958885 A1 | 10/2011 |
| JP | 2008195094 A * | 8/2008 |

OTHER PUBLICATIONS

AZT Automotive GmbH, Information on the implimentation of RCAR crash standards in the German insurance vehicle rating system and information on AEB systems, Aug. 29, 2013. URL: https://www.rcar.org/publishedworks [pdf aus Archive, heruntergeladen am Mar. 3, 2021].

German Search Report issued in German Patent Application No. 102020114756.2 dated Mar. 4, 2021. English translation not available.

International Search Report and Written Opinion issued in PCT Application No. PCT/EP2021/064006 dated Aug. 27, 2021. English translation not available.

* cited by examiner

FRONT STRUCTURE FOR A UTILITY VEHICLE, PREFERABLY FOR A LORRY

CROSS-REFERENCE TO RELATED APPLICATIONS

This application is a 371 application of PCT/EP2021/064006 filed May 26, 2021 which claims benefit of and priority to German Patent Application Serial No. DE102020114756.2 filed Jun. 3, 2020, the disclosures of the above-identified applications are hereby incorporated by reference in their entirety.

BACKGROUND

1. Technical Field

The present disclosure relates to a front structure for a utility vehicle, preferably for a lorry, and a utility vehicle having such a front structure.

2. Description of Related Art

Front structures for utility vehicles are inter alia configured in such a manner that crash forces are reliably absorbed with adequate deceleration values being complied with. In this instance, free spaces for structures, such as in particular a front cooler module for a drive unit, should be taken into account. In this instance, it is necessary for the driver compartment or the driver's cab which is supported on the front structure to become deformed in terms of shape in the event of a front-end crash, for the driver and the other passengers to survive the accident as far as possible without relatively significant injuries. Since most lorries are of the forward control type and consequently do not have relatively long crumple zones, in the event of a frontend impact the driver's cab has to be moved away from the crash zone. In this instance, it has been found to be advantageous that, in order to ensure optimum safety, the driver's cab is moved backward counter to the travel direction until the crash obstacle comes to rest on the engine block which is arranged slightly offset toward the rear below the driver's cab.

In order to provide a front structure which in addition to adequate deformation paths in the event of a front-end crash enables advantageous arrangements of cooler modules, the Offenlegungsschrift EP 2 719 565 A1 proposes a front structure for a utility vehicle which has lateral frame longitudinal beams, a bumper cross-beam and a cross-beam which is arranged therebelow and which acts as an underride protection. The cross-beam at the same time supports a cooler module which is arranged behind the bumper cross-beam and between the frame longitudinal beams. In this instance, the underride protection cross-beam is, when viewed from the side with respect to the bumper cross-beam, offset to the rear with respect to the vehicle outer contour by a longitudinal offset and supports in particular the cooler module.

The Offenlegungsschrift EP 2 397 391 A2 proposes in a similar manner in order to solve this problem a front structure for a utility vehicle which has a frame substructure having two longitudinal beams which extend in a longitudinal vehicle direction, a driver's cab which is resiliently supported above the longitudinal beams, a drive unit which is arranged at the front and supported between the longitudinal beams and a cooler which is positioned in front thereof when viewed in the longitudinal vehicle direction and a cross-beam which connects the longitudinal beams. In this instance, the cross-beam is arranged in the direction of the vertical vehicle axis below and/or in the longitudinal vehicle direction behind the lower edge region of the cooler.

EP 972 700 A2 describes a driver's cab support of a utility vehicle, wherein there is provided a stabilizer rocker arm which is connected to a vehicle frame at a rear end by means of a bearing block and which is connected to the driver's cab at the front end by means of a resilient damper strut.

However, such embodiments do not in all cases ensure safe recoiling of the driver's cab in the event of a crash.

SUMMARY

An object of the present disclosure is therefore to provide a front structure for a utility vehicle which has better crash behavior compared with the prior art. An object of the present disclosure is in particular to provide a front structure which is advantageous in technical structure and production terms, which enables adequate backward displacement of the driver's cab in the event of a front-end crash and which enables an advantageous arrangement of cooler modules.

The object is achieved with a front structure according to the independent claim. Advantageous developments are set out in the dependent claims and the description with partial reference to the Figures.

The front structure is suitable as a front structure for a utility vehicle, preferably for a lorry. The front structure comprises two lateral frame longitudinal beams of a chassis frame (ladder type frame) of the utility vehicle. The front structure further comprises a cooler module which is arranged between the frame longitudinal beams and which is supported by means of lateral pivot bearings with a common pitch axis indirectly or directly at the frame longitudinal beam side. The pivot bearings can consequently be secured at a connection location which is secured to the frame longitudinal beam, either directly on the frame longitudinal beam itself or via a component which is arranged securely on the frame longitudinal beam.

The front structure further comprises a hinged support which is secured to the cooler module and which is supported indirectly or directly on the frame longitudinal beam for absorbing pitch movements of the cooler module.

In this instance, the hinged support has a desired failure location, for example, a desired breaking location, which is configured under the crash-related action of forces to fail during a frontend crash in order to release and/or no longer to absorb a pitch movement of the cooler module.

The features of the above front structure enable an advantageous crash behavior of the cooler module in order to increase the rear displacement of the driver's cab in the event of a frontend crash. The independent failure of the hinged support in the event of a front-end crash enables a pitch or pivot movement of the cooler module in the frame longitudinal beam direction and thereby releases an additional rotation path compared with an intact hinged support. It is thereby possible for an element of a carrier structure of the driver's cab, which element is positioned in front of the cooler module—when viewed in the longitudinal vehicle direction, for example, a stabilizer rocker, to be displaced further backward by means of the crash-related action of forces and consequently for the rear displacement of the driver's cab in the event of a front-end crash to be increased.

The front structure is intended to be understood to be, in the front region of the utility vehicle, a structure which comprises components of the carrier structure and front support of the driver's cab. A crash-related action of forces during a front-end crash may involve exceeding a predetermined or critical force or energy action on the front structure, in particular on the cooler module, in the event of an impact or a front-end crash situation.

In a particularly preferred embodiment, the cooler module has a front cooler and a rear cooler which is preferably arranged plane-parallel with the front cooler. The terms "front" and "rea" relate to the usual meaning of these terms in a front structure which is arranged in the front region of the utility vehicle, that is to say, the front cooler is—when viewed in the forward travel direction of the utility vehicle—arranged in front of the rear cooler. For better distinction, the front cooler is also referred to below as the first cooler and the rear cooler is also referred to below as the second cooler. The first cooler and the second cooler are in this preferred embodiment connected to each other by means of an articulated connection. In this instance, a movement of the second cooler relative to the first cooler via the articulated connection is prevented by a mechanical securing. The mechanical connection is characterized in that it has a desired failure location, for example, a desired breaking location which is configured in the event of crash-related action of forces to fail in the event of a front-end crash in order to release a movement of the second cooler relative to the first cooler via the articulated connection. By means of this second desired failure location of the front structure, the block formation of the first and second cooler relative to the cooler module is independently broken up in the event of a crash so that the two coolers can move in a controlled manner relative to each other in the event of a crash via the articulated connection.

The rotation path of the cooling module and consequently the backward displacement of the driver's cab in the event of a front-end crash can thereby be further increased.

In a variant of this embodiment, the mechanical securing is carried out by a rigid connection element which is provided with a desired breaking location and which is arranged between the two coolers and rigidly connected thereto. The rigid connection element may, for example, be in the form of a web which has a desired breaking location. This enables a cost-effective and space-saving implementation of the mechanical securing. The mechanical securing can consequently be provided in a state structurally separated from the articulated connection. Alternatively, however, the mechanical securing may also be structurally integrated in the mechanical securing.

The desired breaking location may be formed by an advantageously configured geometric shape of the rigid connection element which, when a critical force which acts on the rigid connection element in the event of a front-end crash is exceeded, leads to a breakage of the connection element. The geometric shape may, for example, be produced in the form of a constriction. An alternative embodiment of a geometric shape which is configured in an advantageous manner may make provision for the cross section of the entire connection element, for example, the struts, to be weakened in order to form the desired breaking location. Alternatively, the desired breaking location may be configured by a locking connection which independently disengages or is destroyed in the event of a crash.

The front structure may further in a manner known per se have an underride protection device which is arranged below the frame longitudinal beam, also referred to as an underride guard. Such underride protection devices are intended to prevent smaller vehicles (passenger vehicles, bicycles) from driving under the structures, wheels or the chassis of the utility vehicle from the front in the event of a road accident.

In one embodiment, the underride protection device is arranged below a lower end region of the first cooler and at the height of a lower end region of the second cooler. This affords the advantage that, when the hinged support fails in the event of a front-end crash, as a result of the desired failure location thereof the front cooler can rotate beyond the underride guard in order to thus improve the backward displacement of the driver's cab.

In this instance, the front structure is preferably sized and/or configured in such a manner that, in the event of a crash-related action of forces in the case of a front-end crash, and after failure of the hinged support and the mechanical securing at the respective desired failure locations, the lower region of the first cooler pivots forward over the underride protection device and the second cooler is displaced backward via the articulated connection, for example, pivoted. This may be carried out, for example, by the desired failure location of the mechanical securing between the first cooler and second cooler being configured in such a manner that it fails in the event of a front-end crash when the second cooler strikes the underride guard with the lower end region thereof in the event of a front-end crash so that the first cooler can then pivot over the underride guard as a result of the crash-related action of forces and is not blocked by the larger rear cooler.

In one embodiment, the hinged support is in the form of at least one coupling rod. The coupling rod may have securing joints at the ends thereof. Alternatively or additionally, the coupling rod may be constructed in a rigid manner and may extend substantially in the frame longitudinal beam direction and/or in the longitudinal vehicle direction. The desired failure location of the hinged support may be constructed by means of a geometric shape, for example, in the form of a constriction of the coupling rod, which leads to breakage of the coupling rod under the action of typical forces which occur in the event of a front-end crash. A frame longitudinal beam direction is intended to be understood to be the longitudinal direction of the frame longitudinal beams which corresponds to a longitudinal vehicle direction.

In one embodiment, the hinged support is secured directly at the vehicle side to at least one of the frame longitudinal beams or is secured to a component which is secured to the frame longitudinal beam. Such a component may, for example, be the front underride protection device, a bracket for this or a drive unit or battery module which is arranged between the frame longitudinal beams.

In another embodiment, the articulated connection for connecting the first cooler and second cooler is arranged at an upper end region of the first and second cooler and in the form of a pivot connection. This advantageously enables, after failure of the mechanical securing in the event of a front-end crash, a pivoting of the lower region of the first cooler forward and/or a pivoting of the lower region of the second cooler backward in order to release a greater rotation path of the cooler module in the event of a front-end crash.

In a preferred embodiment, the first cooler is a charge air cooler or a coolant cooler and the second cooler is a coolant cooler, for example, a water cooler. Furthermore, the first cooler and the second cooler may be arranged one behind the other.

The front structure may further in a manner known per se have a U-shaped stabilizer rocker which is articulated in the region of the rear ends thereof on bearing blocks which are arranged so as to be secured to the frame longitudinal beams. The cooler module is in this instance arranged behind a stabilizer rod of the stabilizer rocker.

The stabilizer rocker may have at each of the two outer sides thereof a member which is arranged substantially in the frame longitudinal beam direction, wherein the members are connected in the region of the front ends thereof by means of a stabilizer rod which extends transversely relative to the frame longitudinal beam direction and are supported in the region of the rear ends thereof in each case on a bearing block which is arranged on one of the frame longitudinal beams. The stabilizer rocker may support a driver's cab which is supported on the front structure in the longitudinal and transverse direction but permit resilient movements in a vertical direction, that is to say, in the direction of the vertical vehicle axis. The stabilizer rocker is therefore also referred to as a driver's cab bearing rocker.

In a preferred variant, the stabilizer rod is arranged at the height of an upper half, in a further preferred manner at the height of an upper third, of the cooler module. In other words, the stabilizer rod extends transversely relative to the cooler module in an upper half of the cooler module so that the stabilizer rod is pressed in the event of a front-end crash against the upper half of the front side of the cooler module.

The front structure may in this instance be constructed in such a manner that, under the crash-related action of forces in the event of a front-end crash, as a result of failure of the hinged support at the desired failure location thereof and the mechanical securing at the desired failure location thereof, a backward displacement space of the stabilizer rocker is increased in order to increase a backward displacement of a driver's cab which is supported on the front structure in the event of a front-end crash.

The present disclosure further relates to a utility vehicle comprising a front structure, as described in this document. A utility vehicle is a vehicle which is configured as a result of its construction type and configuration for transporting people, for transporting goods or for pulling trailer vehicles. Thus, the vehicle may, for example, be a lorry, a semitrailer and/or a bus.

BRIEF DESCRIPTION OF THE DRAWING

The preferred embodiments and features of the present disclosure as described above can be freely combined with each other. Other details and advantages of the present disclosure are described below with reference to the appended drawings, in which.

DETAILED DESCRIPTION

Figure 1:
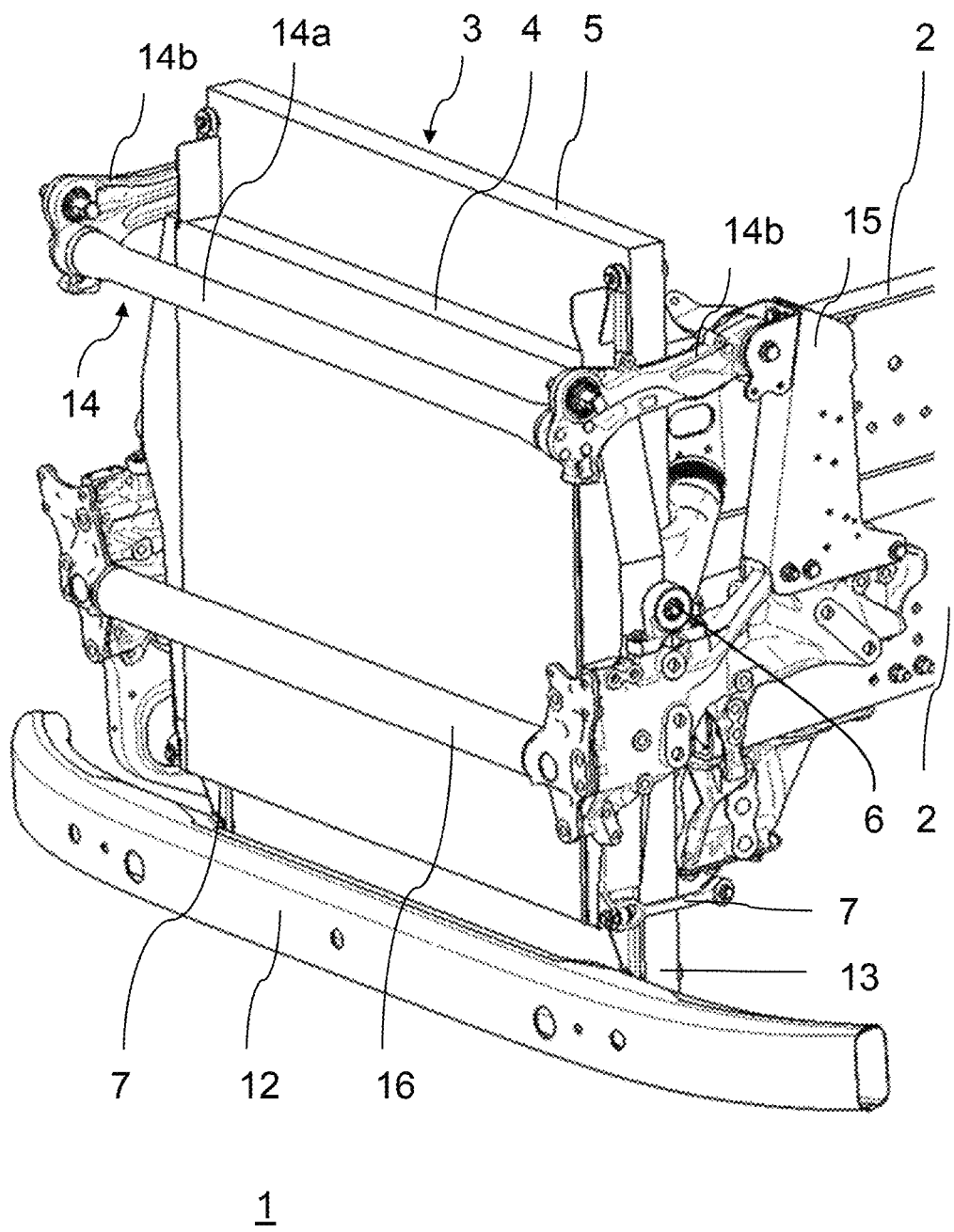
FIG. 1 shows a perspective view of the front structure according to an embodiment of the present disclosure.

Elements which are identical or equivalent are given the same reference numerals in all the Figures and are sometimes not described separately.

Figure 4:
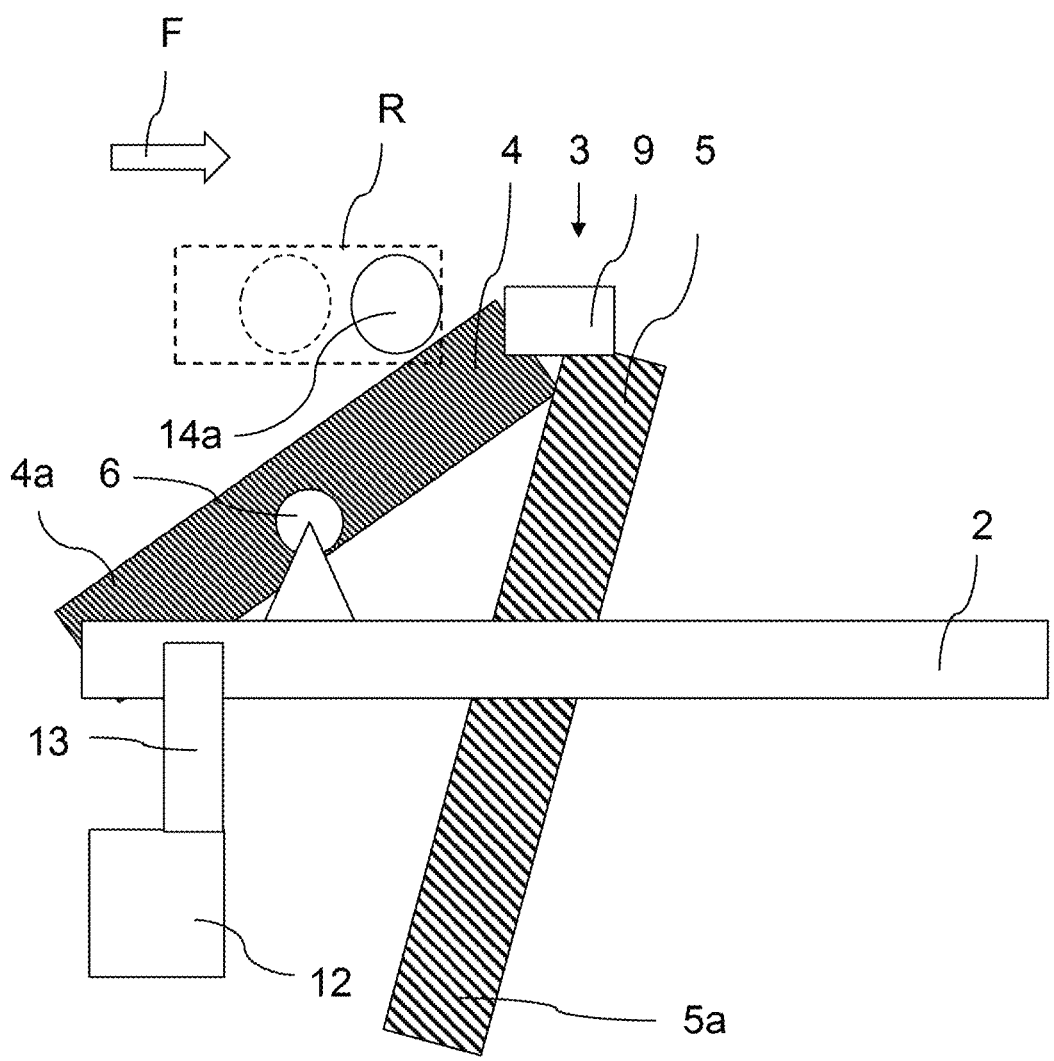
FIG. 4 shows the view of FIG. 2 in a second deformation state during a front-end crash.
Figure 5:
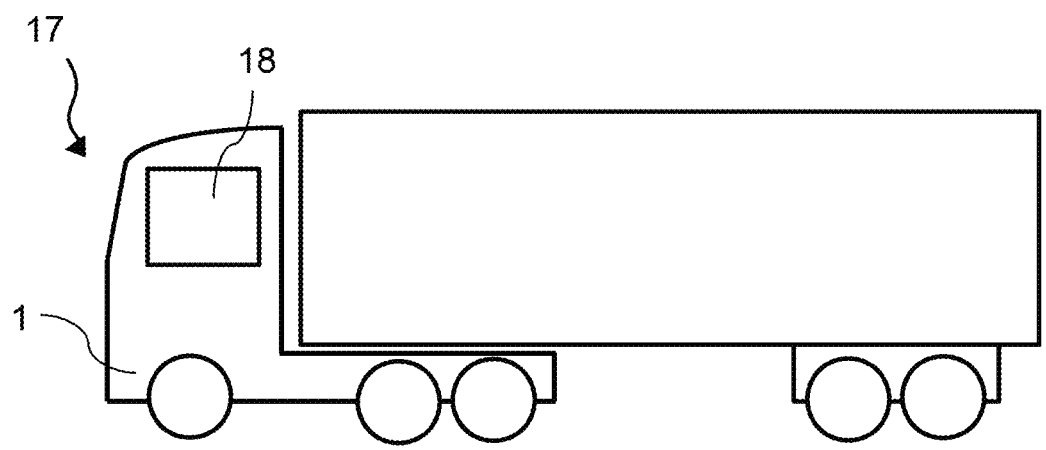
FIG. 5 shows a utility vehicle.

FIG. 1 shows a perspective view of the front structure 1 of a utility vehicle which is illustrated in FIG. 4 purely by way of example in the form of a lorry 17.

The front structure 1 shown in FIG. 1 comprises in a manner known per se two lateral frame longitudinal beams 2 and a cooler module 3 which is arranged between the frame longitudinal beams.

The cooler module 3 has a front first cooler 4 and a rear second cooler 5 which is arranged plane-parallel with the first cooler. The two coolers 4, 5 are configured in a plate-like manner. In this instance, the first cooler 4 is a charge air cooler and the second cooler 5 is a coolant cooler for example, a water cooler. The coolant cooler 6 is connected to a coolant circuit (which is not illustrated) of an internal combustion engine of the vehicle, whilst the charge air cooler 4 serves to cool the charged combustion air of the internal combustion engine. The cooler module may comprise additional components, for example, a capacitor of a coolant circuit of an air-conditioning system. The inner structure and the fluidic connections of the two coolers 4 and 5 may be configured in a manner known per se and do not have to be described in greater detail here.

FIG. 1 further shows a front cross-beam 16 by means of which the front regions of the two frame longitudinal beams 2 are connected to each other. The front structure 1 further has an underride protection device 12 or an underride protection profile which is arranged below the front cross-beam 3 and below the frame longitudinal beams 2 and which substantially comprises a tubular material which is bent over at the left side and right side in a slightly U-shaped manner counter to the travel direction. The underride protection device 12 may be secured to a front end region of the frame longitudinal beams by means of brackets or to a bearing block or a connection console which is secured to the front end region of the frame longitudinal beams 2.

The front structure 1 further has a U-shaped stabilizer rocker 14 which is articulated in the region of the rear ends thereof to bearing blocks 15 which are in turn arranged to be secured to the frame longitudinal beam and which extend above the frame longitudinal beams 2 in the vertical vehicle axis direction. The stabilizer rocker 14 has at the two outer sides thereof members 14b which are arranged in each case substantially in the frame longitudinal beam direction. The members 14b are connected in the region of the front end thereof by means of a stabilizer rod 14a which extends transversely relative to the frame longitudinal beam direction and are supported in the region of the rear ends thereof on one of the bearing blocks 15 in each case. The stabilizer rod 14a is arranged in front of the cooler module 3 and at the height of an upper half of the cooler module 3.

This front structure 1 is used for front support (not fully illustrated in this instance) of a driver's cab (not illustrated) of a lorry. In this instance, in a manner known per se and purely by way of example, the driver's cab can be secured at the front to two connection consoles, articulated by means of these to two resilient damper struts, cushioned via these with respect to the frame longitudinal beam 2 and further guided transversely on the U-shaped stabilizer rocker 14 and pivotably articulated for tilting. The connection consoles may be composed of two portions, that is to say, an upper carrier portion on which the driver's cab is secured and a lower bearing portion on which at one location a resilient damper strut and at another location the stabilizer rocker 14 are articulated.

The entire cooling module 3 is supported via the front first cooler 4 with respect to the utility vehicle. To this end, the cooler module 6 is supported via the front first cooler 4 by means of lateral pivot bearings 6 with a common pitch axis at the frame longitudinal beam side, which can be better seen in FIGS. 2 to 4. The pivot bearing 6 has an articulation location through which a pivot axis which extends perpendicularly to the drawing plane, that is to say, in the Y direction, extends. The cooler module 3 can consequently be pivoted about this pivot axis through the articulation location.

Figure 2:
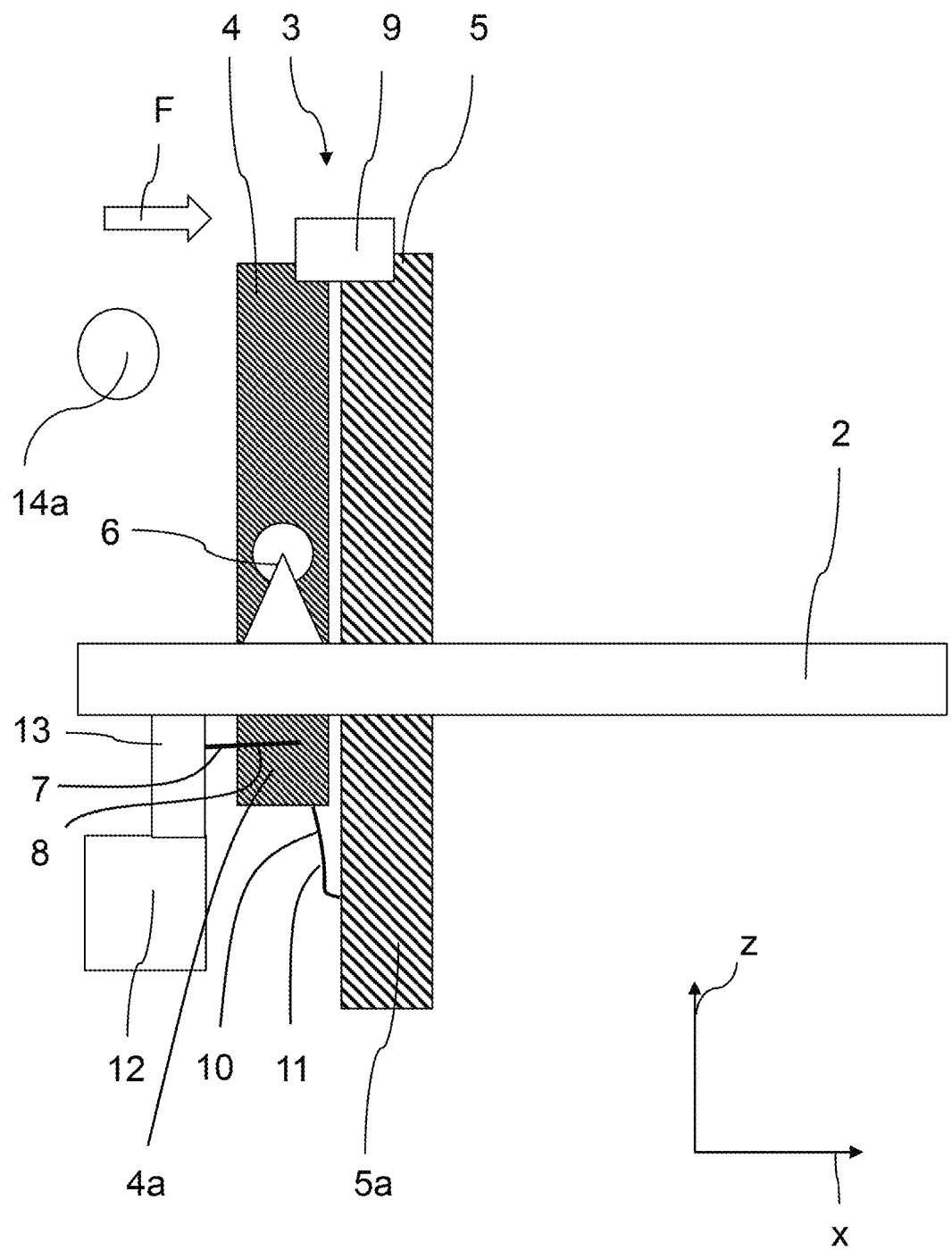
FIG. 2 shows a highly schematic side view of the front structure in the non-deformed initial state according to an embodiment of the present disclosure.

There is further provided a hinged support 7 which is concealed in FIG. 1 by the frame longitudinal beams 2 but which is illustrated schematically in FIG. 2. As can be seen in FIG. 2, the hinged support 7 is secured at one end to the cooler module 3 and is supported at the other end at the side of the frame longitudinal beam. The hinged support 7 consequently absorbs pitch movements of the cooler module 4 which are produced during travel operation as a result of vibrations, shocks, etcetera. The hinged support 7 may be in the form of a tie bar or a coupling rod which is connected in the end region thereof in an articulated manner.

The hinged support extends substantially in the frame longitudinal beam direction or in the longitudinal vehicle direction. This direction is designated x in FIG. 2. The vertical vehicle axis direction is designated y.

The hinged support 7 has a desired breaking location 6 which is configured in such a manner that the hinged support breaks at the desired breaking location 8 under the crash-related action of forces F in the event of a front-end crash in order to release and/or no longer to absorb a pitch movement of the cooler module 3. The desired breaking location is consequently intended to be configured in such a manner that it breaks when forces which typically occur in the event of a front-end impact event or front-end crash act on the hinged support or the desired breaking location. The desired breaking location 8 can be produced by means of a geometric shape, for example, in the form of a constriction of the hinged support 7.

As further schematically illustrated in FIG. 2, the first cooler and the second cooler 4, 5 are connected to each other by means of an articulated connection 9. In this instance, the articulated connection 9 is arranged at an upper end region of the first cooler and second cooler 4, 5 and in the form of a pivot joint whose pivot axis corresponds to a pivot axis which extends perpendicularly to the drawing plane, that is to say, in the y direction.

In the initial state, however, the movement of the second cooler 5 relative to the first cooler 4 is prevented by a mechanical securing 10 which is in the form of a rigid connection element 10 which is arranged between the two coolers 4, 5 and which is securely connected thereto. The connection element 10 may be in the form of a rigid web or strut.

The mechanical securing or the connection element 10 also has a desired breaking location 11 which is configured to break under the crash-related action of forces F in the event of a front-end crash in order to release a movement of the second cooler 5 relative to the first cooler 4 via the articulated connection 9. The desired breaking location 11 may be produced by means of a geometric shape, for example, in the form of a constriction of the connection element 10.

FIG. 2 shows an initial state of the front structure 1 prior to a front-end crash event in which both the hinged support 7 and the mechanical securing 10 are intact, that is to say, are not broken at the desired breaking locations 8 and 11 thereof, respectively.

Figure 3:
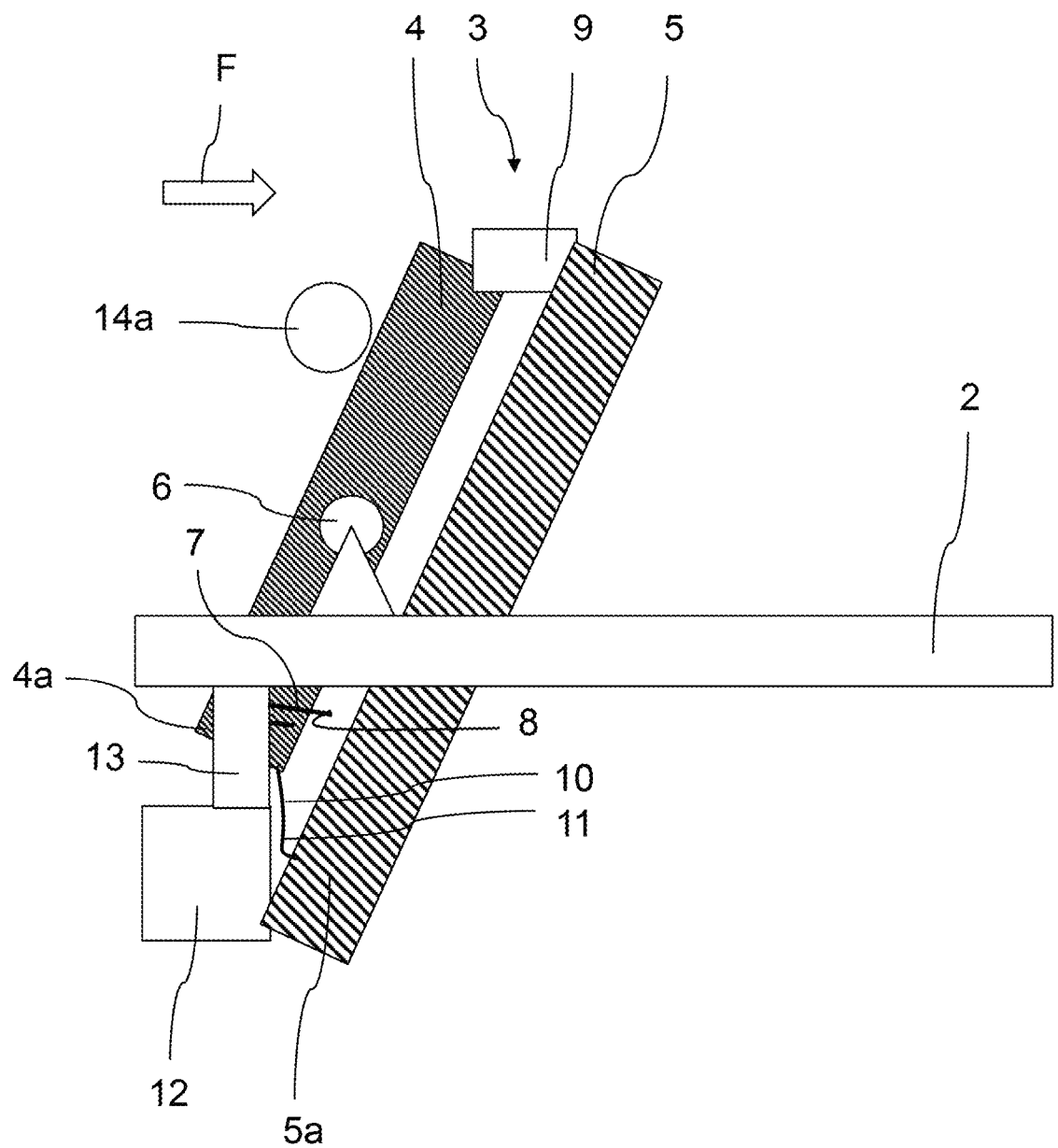
FIG. 3 shows the view of FIG. 2 in a first deformation state during a front-end crash.

FIG. 3 shows in contrast the view of FIG. 2 in a first deformation state during a front-end crash, in which the hinged support 7 is already broken at the desired breaking location 8 as a result of the crash-related action of forces F in the event of a front-end crash. In the event of a front-end crash, the stabilizer rod 14a of the stabilizer rocker 14 is pressed against the upper front region of the front cooler 4 as a result of the crash. The force F leads to breakage of the hinged support 7 at the desired breaking location 8.

Accordingly, the cooler module 3 may carry out a pitch movement about the pivot axis of the pivot bearing 6, wherein the upper portion of the cooler module 3 pivots backward and the lower portion of the cooler module 3 pivots forward. The two coolers 4 and 5 are, however, still rigidly connected by means of the mechanical securing 10.

Since the underride protection device 12 extends below a lower end region 4a of the first cooler 4, but at the height of a lower end region 5a of the second cooler 5, the lower portion 5a of the second cooler 4 strikes the underride protection device 12. This leads to breakage of the mechanical securing 10 at the desired breaking location 11.

This leads to a situation which is illustrated in FIG. 4. After breakage of the desired breaking location 11, this releases a further rotation path of the cooler module 3. The two coolers 4, 5 and are now still connected only in an articulated manner at the articulated connection 9 so that the front cooler 4, as a result of the crash-related action of force F of the stabilizer rod 14a, pivots further so that the upper region of the first cooler is moved further backward and consequently releases a larger deformation space for the stabilizer rod 14a. The lower region 5a of the rear cooler 5 can pivot away from the lower region 4a of the front cooler 4.

The backward displacement space R available in the event of a crash for the stabilizer rocker 14 and consequently the backward displacement space for the driver's cab which is connected to the stabilizer rocker is thereby increased overall.

The front structure shown consequently enables, in the event of a crash-related action of force in the case of a front-end crash, as a result of failure of the hinged support 7 at the desired failure location 8 thereof and as a result of the failure of the mechanical securing 10 at the desired failure location 11 thereof, a backward displacement space of the stabilizer rocker 14 to be increased. A backward displacement of a driver's cab 18 which is supported on the stabilizer rocker 14 in the event of a front-end crash is thereby increased. The driver's cab can thereby be moved even further out of the crash zone in the event of a front-end impact. As a result of the greater cab backward displacement of the driver's cab, the intrusion of the cab in the event of a crash is significantly reduced, and the survival spaces for the passenger in the event of a crash are significantly increased.

The present disclosure is not limited to the above-described preferred embodiments. Instead, a large number of variants and modifications which also make use of the notion of the present disclosure and are therefore included within the protective scope are possible. In particular the present disclosure also claims protection for the subject-matter and the features of the dependent claims regardless of the claims referred to. In particular, the individual features of the independent claim 1 are disclosed in each case independently of each other. In addition, the features of the dependent claims are also disclosed independently of all the features of the independent claim 1. All range indications herein are intended to be understood to be disclosed in such a manner that all the values falling within the respective range are disclosed individually so to speak, for example, also as preferred narrower outer limits of the respective range.

LIST OF REFERENCE NUMERALS

1 Front structure
2 Frame longitudinal beam
3 Cooler module

4 First cooler
4a Lower region of the first cooler
5 Second cooler
5a Lower region of the second cooler
6 Pivot bearing
7 Hinged support, for example, desired breaking location
8 Desired failure location
9 Articulated connection
10 Mechanical securing
11 Desired failure location, for example, desired breaking location
12 Underride protection device
13 Bracket
14 Stabilizer rocker
14a Stabilizer rod
14b Member
15 Bearing block
16 Front cross-beam
17 Utility vehicle
18 Driver's cab
F Action of force in the event of a front-end crash
R Backward displacement space

The invention claimed is:

1. A front structure for a utility vehicle, comprising:
a) two lateral frame longitudinal beams;
b) a cooler module which is arranged between the frame longitudinal beams and which is supported by means of lateral pivot bearings with a common pitch axis at the frame longitudinal beam side; and
c) a hinged support which is secured to the cooler module and which is supported indirectly or directly on the frame longitudinal beam for absorbing pitch movements of the cooler module, wherein the hinged support has a desired failure location which is configured under the crash-related action of forces to fail in the event of a front-end crash in order to release and/or no longer to absorb a pitch movement of the cooler module.

2. The front structure as claimed in claim 1, wherein
a) the cooler module has a front first cooler and a rear second cooler;
b) the first cooler and the second cooler are connected to each other by means of an articulated connection; and
c) a movement of the second cooler relative to the first cooler via the articulated connection is prevented by a mechanical securing which has a desired failure location which is configured in the event of crash-related action of forces to fail in the event of a front-end crash in order to release a movement of the second cooler relative to the first cooler via the articulated connection.

3. The front structure as claimed in claim 2, wherein the mechanical securing is carried out by a rigid connection element which is provided with a desired breaking location and which is arranged between the two coolers and rigidly connected thereto.

4. The front structure as claimed in claim 2, wherein
a) the rear second cooler is arranged plane-parallel with the first cooler; or
b) the mechanical securing is carried out by a rigid connection element which is a web.

5. The front structure as claimed in claim 3, wherein the desired breaking location is formed by a geometric shape or configured by means of a locking connection which independently disengages or is destroyed in the event of a crash.

6. The front structure as claimed in claim 1, further having an underride protection device which is arranged below the frame longitudinal beams.

7. The front structure as claimed in claim 6, wherein the underride protection device is arranged below a lower end region of the first cooler and at the height of a lower end region of the second cooler.

8. The front structure as claimed in claim 7, wherein the front structure is sized and configured in such a manner that, in the event of a crash-related action of forces in the case of a front-end crash and after failure of the hinged support and the mechanical securing at the respective desired failure locations, the lower region of the first cooler pivots forward over the underride protection device and the second cooler pivots backward via the articulated connection.

9. The front structure as claimed in claim 1, wherein the hinged support is in the form of at least one coupling rod which
a) has securing joints at the ends thereof; and/or
b) is constructed in a rigid manner and extends substantially in the frame longitudinal beam direction and/or in the longitudinal vehicle direction.

10. The front structure as claimed in claim 1, wherein the hinged support is secured directly at the vehicle side to at least one of the frame longitudinal beams or is secured to a component which is secured to the frame longitudinal beam, wherein the component is a front underride protection device or a bracket for this or a drive unit or battery module which is arranged between the frame longitudinal beams.

11. The front structure as claimed in claim 2, wherein the articulated connection is arranged at an upper end region of the first and second cooler and is in the form of a pivot connection.

12. The front structure as claimed in claim 2, wherein
a) the first cooler is a charge air cooler or coolant cooler and the second cooler is a coolant cooler, for example, a water cooler; and/or
b) the first cooler and the second cooler are arranged one behind the other.

13. The front structure as claimed in claim 1, further having a U-shaped stabilizer rocker which is articulated in the region of the rear ends thereof on bearing blocks which are arranged so as to be secured to the frame longitudinal beams, wherein the cooler module is arranged behind a stabilizer rod of the stabilizer rocker.

14. The front structure as claimed in claim 13, wherein the stabilizer rocker has at each of the two outer sides thereof a member which is arranged substantially in the frame longitudinal beam direction, wherein the members are connected in the region of the front ends thereof by means of a stabilizer rod which extends transversely relative to the frame longitudinal beam direction and are supported in the region of the rear ends thereof in each case on a bearing block which is arranged on one of the frame longitudinal beams.

15. The front structure as claimed in claim 14, wherein the stabilizer rod is arranged at the height of an upper half of the cooler module.

16. The front structure as claimed in claim 13, wherein, under the crash-related action of forces in the event of a front-end crash, as a result of failure of the hinged support at the desired failure location thereof, a backward displacement space of the stabilizer rocker is increased in order to increase a backward displacement of a driver's cab which is supported on the front structure in the event of a front-end crash.

17. The front structure as claimed in claim 13, wherein, under the crash-related action of forces in the event of a front-end crash, as a result of failure of a mechanical securing at a desired failure location thereof, a backward displacement space of the stabilizer rocker is increased in order to increase a backward displacement of a driver's cab which is supported on the front structure in the event of a front-end crash.

18. A utility vehicle comprising a front structure as claimed in claim 1.

19. The utility vehicle of claim 18, wherein the utility vehicle is a lorry.

* * * * *